May 12, 1925.
C. J. LANG
1,537,315
MOVING PICTURE SHUTTER
Filed Dec. 20, 1922
2 Sheets-Sheet 1
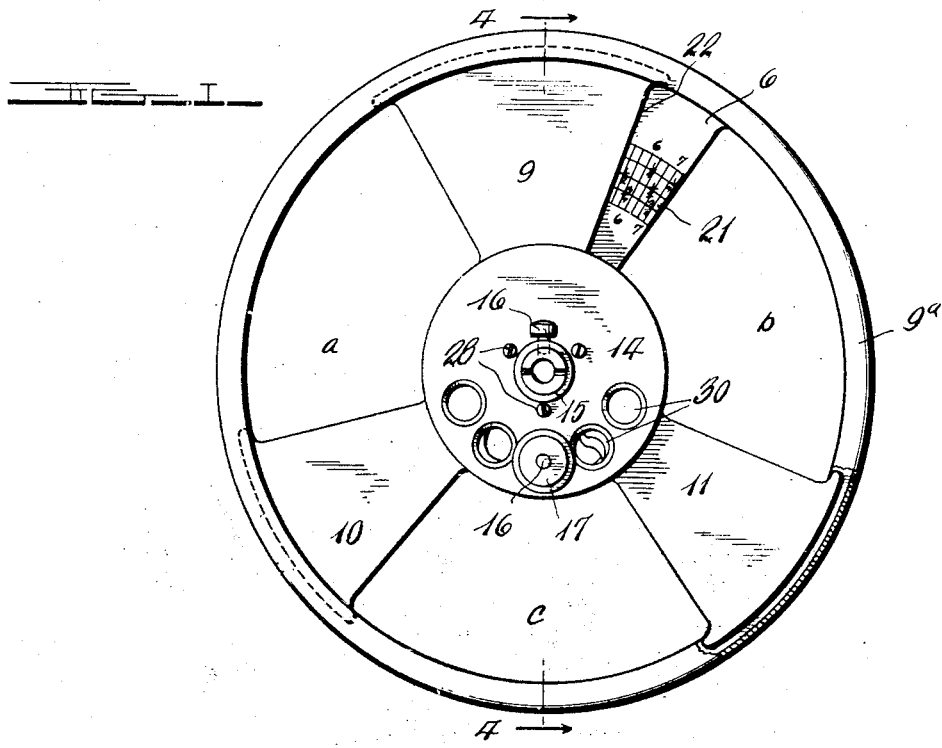
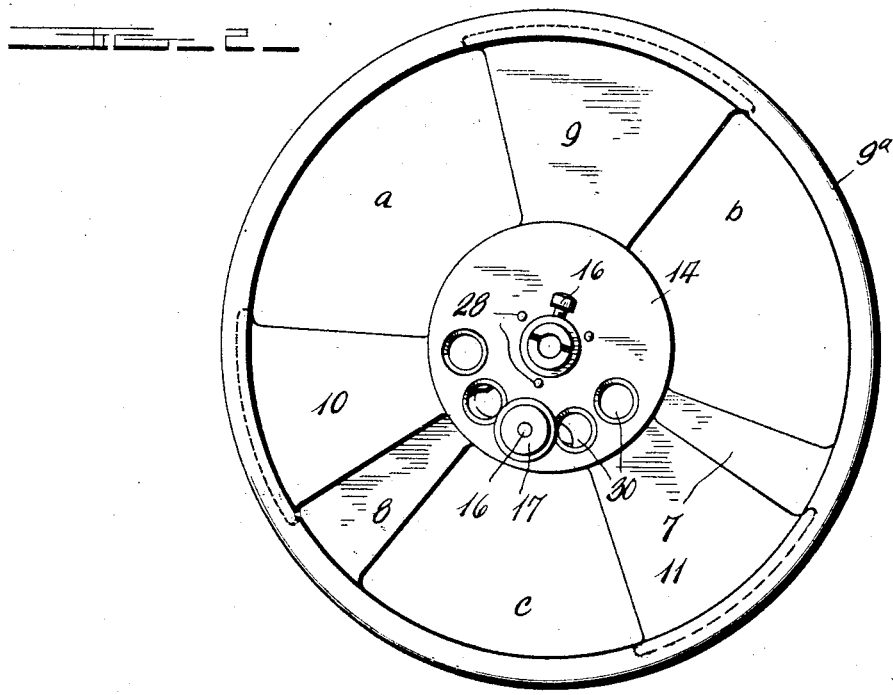
Inventor
Carl J. Lang
By Geo. E. Low Attorney

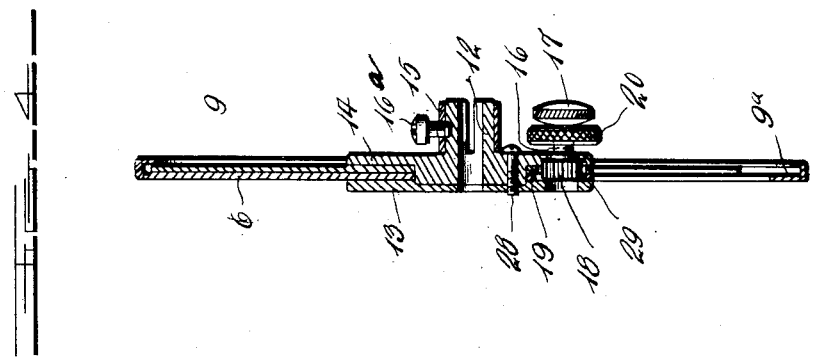
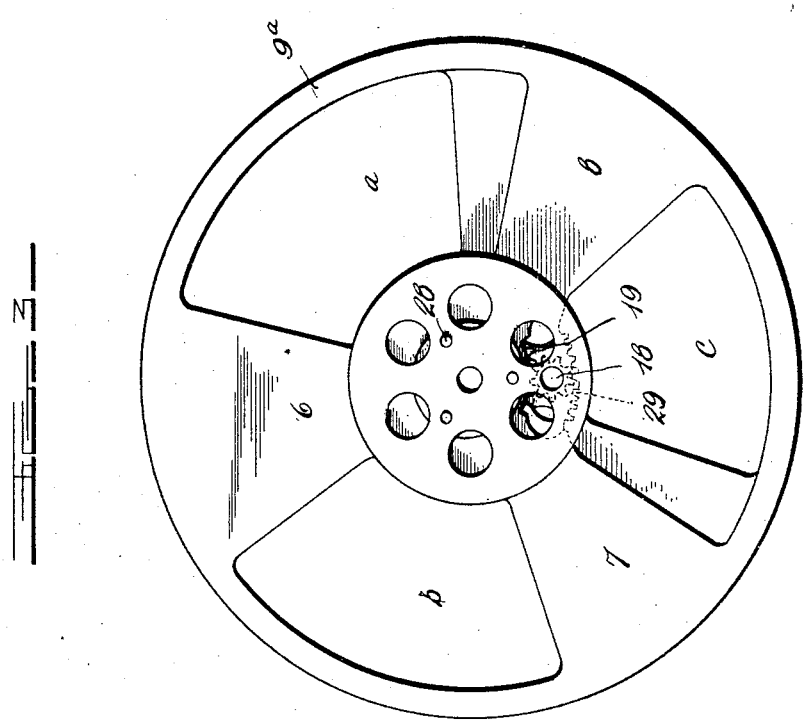

Patented May 12, 1925.

1,537,315

UNITED STATES PATENT OFFICE.

CARL J. LANG, OF OLEAN, NEW YORK.

MOVING-PICTURE SHUTTER.

Application filed December 20, 1922. Serial No. 607,989.

*To all whom it may concern:*

Be it known that I, CARL J. LANG, a citizen of the United States, residing at Olean, in the county of Cattaraugus and State of New York, have invented certain new and useful Improvements in Moving-Picture Shutters, of which the following is a specification.

This invention relates to shutters for moving picture machines, and has for its object to provide an improved adjustable shutter having a new construction and advantages in operation as will be more fully set forth hereinafter.

It is old to make shutters having wings or blades of various widths in order to correspond to different projection distances. One theatre may project a picture at say 150 feet distance, using a long focus lens and another theatre may project a picture at say 100 feet distance using a shorter focus. In the former, the light beam at the shutter is narrower than the latter, which calls for shutters having blades of different widths, and it is the practice of manufacturers to furnish a shutter as nearly suitable as possible for the existing conditions of size of picture and distance from the machine, but these shutters very seldom have the correct width of wings. By means of the present shutter, the blades can be adjusted in width to suit the width of the light beam and other conditions. By means thereof the shutter can be adjusted to just cover the width of the light beam during the intermittent movement of the film.

It is also common to provide a shutter with one wide blade and with several other narrower blades, which latter serve to equalize the light and the dark periods as the shutter passes in front of the lens opening. If the additional wings are too narrow, the picture on the screen will be blurred, and if the shutter has wings wider than necessary, there is considerable loss of light. By means of the present invention, the width of the main and additional blades can be varied. This also permits the shutter to be adjusted for various kinds of machines. Thus some machines make what is known as a three to one movement, and others a five to one movement, for intermittently moving the film. In the former or slow movement, it is more practical and better (in the three-blade shutter) to have the two light openings next to the main or wide blade of a larger area than the light opening directly opposite the main blade. In the five to one or fast movement, the three light openings should be all the same area. This result may be effected by the present invention.

I also place, on one of the shutter sections, a scale indicating adjustment for the focal length of various lenses, by means of which accurate adjustment can be made before the shutter is mounted in the machine.

One form of the invention is illustrated in the accompanying drawings in which Fig. 1 is a front plan view of the shutter with the blades in one position. Fig. 2 is a similar view with the blades in another position. Fig. 3 is a rear plan. Fig. 4 is a section on the line 4—4 of Fig. 1.

Referring now to the drawings, what I term the rear section of the shutter consists of a sheet metal disc having blades 6, 7, and 8, connected by rim $9^a$, and these blades are so arranged as to define three openings. That between the blades 6 and 8 is larger than those between the blades 6 and 7 and 7 and 8, and the two latter are the same size. The blade 6 is somewhat wider than either of the blades 7 and 8, and the two latter are the same width. This is clearly shown in Fig. 3, in which the large opening is indicated at $a$ and the small openings at $b$ and $c$.

With this section is associated a front or shutter section, having three blades 9, 10 and 11, of which the two latter are the same width and the former, 9, is somewhat wider; the blade 9 being the same width as the blade 6, and the blades 10 and 11 being the same width as the blades 8 and 7 respectively. And the front section is so arranged, with respect to the rear section, that the blade 9 laps the blade 6, the blade 10 laps the blade 8, and the blade 11 laps the blade 7, the blade 9, however, being set on a radius relatively different from the blade 6, the distance between the blades 9 and 11 being greater than the distance between the blades 9 and 10 and 10 and 11, the latter being equal. The rim $9^a$ is curled over the ends of the blades 9, 10, and 11, forming a track for the latter.

These sections or discs are rotatably mounted on a hub 12 carried by a front plate 14, the central part of the disc being held between said front plate and a back plate 13, the plates being held together by screws 28. The front end of the hub is split to receive a collar 15 and screw $16^a$ by means of which the hub may be clamped on a spindle, the construction permitting angular adjustment of the sections to vary the effective width of the blades.

This adjustment is effected by means of a pin 16 provided with a knob 17 at its outer end and mounted in a bearing in the front plate 14 behind which the pin carries a pinion 18 which meshes at one side with a segmental rack 19 formed in or on the central part of the front section of the shutter, and on the other side with a segmental rack 29 on the rear section of the shutter, the back plate 13 being recessed to provide space for the pinion to turn. The pin 16 is threaded to receive a thumb nut 20 which may be screwed down against the front plate 14 to lock the sections at adjustment.

The front face of the blade 6 has a scale 21 which is graduated to indicate the focal length by relation to the edge 22 of the blade 9 of the adjustable section.

By turning the knob 17, the sections, by means of the rack and pinion connection, may be swung on the hub as a center to vary the effective width of the blades and accordingly the spaces between the blades. Thus for the fast operation, to produce three spaces of the same size the sections are turned until the blades 10 and 11 match with the blades 8 and 7 respectively in which position the blade 9 is out of line with the blade 6 to an extent sufficiently to partly cover the large opening a in the rear section, as shown in Fig. 1. For the opposite adjustment, the knob is turned in the other direction, and the blade 9 may be swung until it is in line with the blade 6, as shown in Fig. 2, or even beyond, and when this is done, the blades 10 and 11 will uncover the blades 8 and 7 accordingly, the effect of which will be to produce two relatively wide openings a and b of the same width and narrow the opening c to a lesser width.

Accordingly by the arrangement shown the width of each opening may be varied, producing in one position three openings of the same width and in another position two openings of the same width and one narrow opening, the openings in the latter instance being adjustable according to the angle of lens or other local conditions.

As will be understood, the shutter is attached to a spindle which is timed with the intermittent movement of the film, so that the shutter makes one complete revolution at each operation of the film. The wide blade or blades cover the lens during the movement of the film, and the other blades pass the lens during the stationary period of the film. With a three-blade shutter, the two narrow blades pass the lens during said period. But the invention may be embodied in shutters having different numbers of blades. Thus it may be embodied in a two-blade shutter, each section of the shutter having two blades directly opposite each other and of about the same width. The two-blade shutter being usually used when the machine is operated by alternating current, and the three-blade shutter when direct current is used.

The front plate 14 may have some openings 30 cut therein, to correspond to the weight of the adjusting devices, so as to balance the shutter.

The invention is not limited to the particular form shown, but various modifications may be made within the scope of the following claims.

I claim:

1. A shutter comprising two sections fastened together to rotate in the same direction and each having a plurality of cooperating radial blades and intervening openings, said sections being adjustable angularly with respect to each other, to vary the effective size of said openings, both sections having cooperating wide and narrow blades in the respective sections, the wide blades of the respective sections being located at respectively different angles to the narrow blades thereof.

2. A shutter having a central hub structure and a plurality of blade sections thereon angularly adjustable with respect to each other and provided with segmental racks, and a manually rotatable pin mounted in a bearing in the hub structure and provided with a pinion engaging said racks to turn the sections.

3. A shutter having a central hub structure and a plurality of blade sections thereon one of which is angularly adjustable with respect to the other and is provided with a segmental rack, and a manually rotatable pin mounted in a bearing in the hub structure and provided with a pinion engaging said rack to turn the adjustable section.

In testimony whereof, I affix my signature in presence of two witnesses.

CARL J. LANG.

Witnesses:
JAMES M. CLEMENTS,
CARL W. BENSON.